(12) United States Patent
Zheng

(10) Patent No.: US 6,447,078 B1
(45) Date of Patent: Sep. 10, 2002

(54) CONTAINER FOR STORING DISC-LIKE STORAGE MEDIA

(75) Inventor: Gang Zheng, Shunde (CN)

(73) Assignee: Kasihua Electric Appliance Co., Ltd., Shunde (CN)

( * ) Notice: Subject to any disclaimer, the term of this patent is extended or adjusted under 35 U.S.C. 154(b) by 0 days.

(21) Appl. No.: 09/852,571

(22) Filed: May 10, 2001

(30) Foreign Application Priority Data

May 12, 2000 (CN) .......................................... 00234330 U

(51) Int. Cl.[7] .............................................. A47B 81/06
(52) U.S. Cl. .................... 312/9.42; 312/9.44; 312/9.46; 312/305
(58) Field of Search .............................. 312/9.42, 9.43, 312/9.41, 9.44, 9.45, 9.46, 9.64, 9.58, 305, 321.5, 326, 135, 270.2

(56) References Cited

U.S. PATENT DOCUMENTS

| | | | |
|---|---|---|---|
| 1,366,931 A | * | 2/1921 | Peterson |
| 2,021,803 A | * | 11/1935 | Nicols |
| 2,261,806 A | | 11/1941 | Hills |
| 2,562,112 A | * | 7/1951 | Minardi |
| 2,777,574 A | | 1/1957 | Brody |
| 2,905,518 A | * | 9/1959 | Doesken |
| 3,101,227 A | * | 8/1963 | Pugh |
| 3,484,145 A | * | 12/1969 | Skalka |
| 3,848,940 A | * | 11/1974 | Berens |
| 4,179,168 A | * | 12/1979 | Isaac et al. |
| 4,762,225 A | | 8/1988 | Henkel |
| 5,102,181 A | * | 4/1992 | Pinkney |

* cited by examiner

*Primary Examiner*—Janet M. Wilkens
(74) *Attorney, Agent, or Firm*—Antony P. Ng; Bracewell & Pattterson, L.L.P.

(57) ABSTRACT

A container for storing disc-like storage media is disclosed. The container for storing disc-like storage media includes a back cover and a turntable. The back cover has a front opening. The turntable has a substantially planar front side and a fan-shaped back side. The fan-shaped back side includes multiple storage grooves radially distributed around the fan-shaped back side. Each of the storage grooves is capable of receiving a substantially planar storage medium. The turntable is rotatable from a concealed position in which the fan-shaped back side is concealed within the back cover to an exposed position in which the fan-shaped back side is at least partially extends outside of the back cover.

16 Claims, 3 Drawing Sheets

CONTAINER FOR STORING DISC-LIKE STORAGE MEDIA

CROSS REFERENCE TO A RELATED APPLICATION

The present application claims priority from a Chinese patent application No. ZL 00 2 34330.4, filed on May 12, 2000.

BACKGROUND OF THE INVENTION

1. Technical Field

The present invention relates to storage units in general, and in particular to containers capable of storing multiple storage media elements. Still more particularly, the present invention relates to a container having separable slots for storing multiple disc-like storage media.

2. Description of the Prior Art

Recent advancements in storage technology in audio, video and computer arts have resulted in a proliferation of portable high-density storage media capable of storing audio and video information. Examples of such portable high-density storage media include compact discs (CDs), digital-video discs (DVDs), compact video discs (CVDs), etc. Each of the above-mentioned portable high-density storage media is capable of storing large amounts of data representing various voltage levels or digital signals as ultra-fine, microscopic pits along a spiral path in a polymeric substrate, protected by an overlay of another thin polymeric layer. This technique has proven to be greatly superior over conventional phonograph records or tapes for storing audio data. While CDs, DVDs, and VCDs are less vulnerable to scratches, dust and fingerprints, they must still be protected in order to avoid any damage thereto.

Techniques for storing disc-like media have been known in the prior art for decades. U.S. Pat. No. 2,261,806 discloses a carrier case and rack for phonograph records that is reflective of the state-of-the-art in the 1930s. U.S. Pat. No. 2,777,574 discloses a holder for phonograph records that is designed as an alternative to the album cover and record jacket arrangement commonly used with phonograph records. More recently, U.S. Pat. No. 4,762,225 discloses a compact disc guard and carrying system that include a collapsible enclosure having a mouth portion, extensible side portions, a V-shaped vertex portion and a securable fold-over cover that provides an elongated, substantially rigid, yet foldable substrate having a series of pockets within which a compact disc may be stored.

While each of the above-mentioned patents demonstrates a useful technique for storing disc-like media, the problems associated with insertion and retrieval of disc-like media are exacerbated with increased density of storage. Consequently, it would be desirable to provide an improved container having separable slots for storing disc-like media.

SUMMARY OF THE INVENTION

In accordance with a preferred embodiment of the present invention, a container for storing disc-like storage media includes a back cover and a turntable. The back cover has a front opening. The turntable has a substantially planar front side and a fan-shaped back side. The fan-shaped back side includes multiple storage grooves radially distributed around the fan-shaped back side. Each of the storage grooves is capable of receiving a substantially planar storage medium. The turntable is rotatable from a concealed position in which the fan-shaped back side is concealed within the back cover to an exposed position in which the fan-shaped back side is at least partially extends outside of the back cover.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
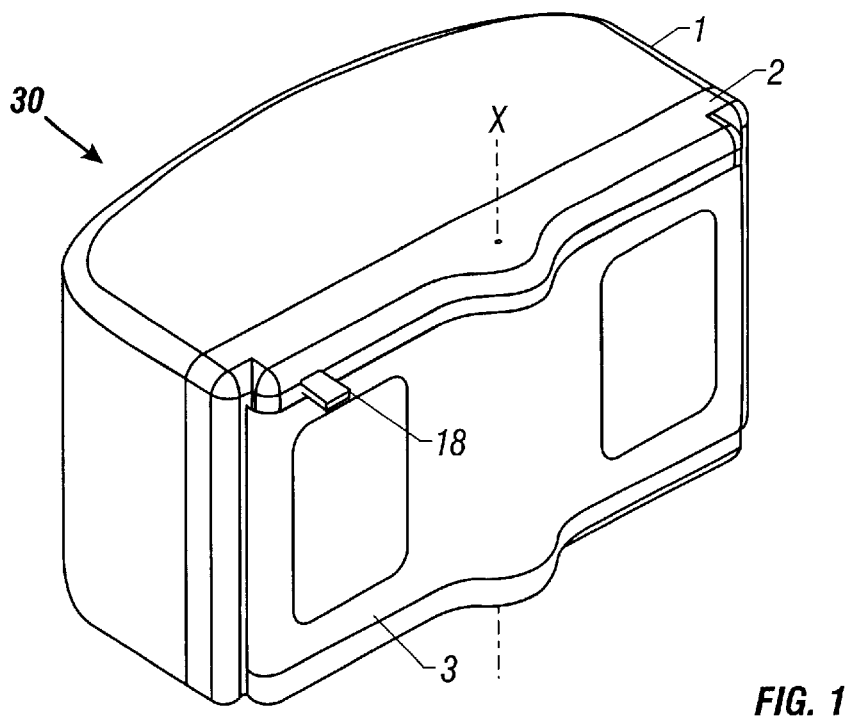
FIG. 1 is an isometric view of a disc container having a turntable in a conceal position, in accordance with a preferred embodiment of the present invention.

Referring now to the drawings and in particular to FIG. 1, there is depicted an isometric view of a disc container 30 in accordance with a preferred embodiment of the present invention. As shown, disc container 30 includes a back cover 1, a frame 2, a turntable 3, and a spring-loaded lever 18 located at frame 2. Each of these components may be fabricated by, for example, metal or plastic such as poly vinyl chloride or polyethylene.

In FIG. 1, disc container 30 is illustrated with turntable 3 in a concealed position. Turntable 3 can be released from the concealed position to an exposed position by preferably lifting spring-loaded lever 18. Once spring-loaded lever 18 is lifted, turntable 3 begins to turn anti-clockwise about axis x to the exposed position.

Figure 2:
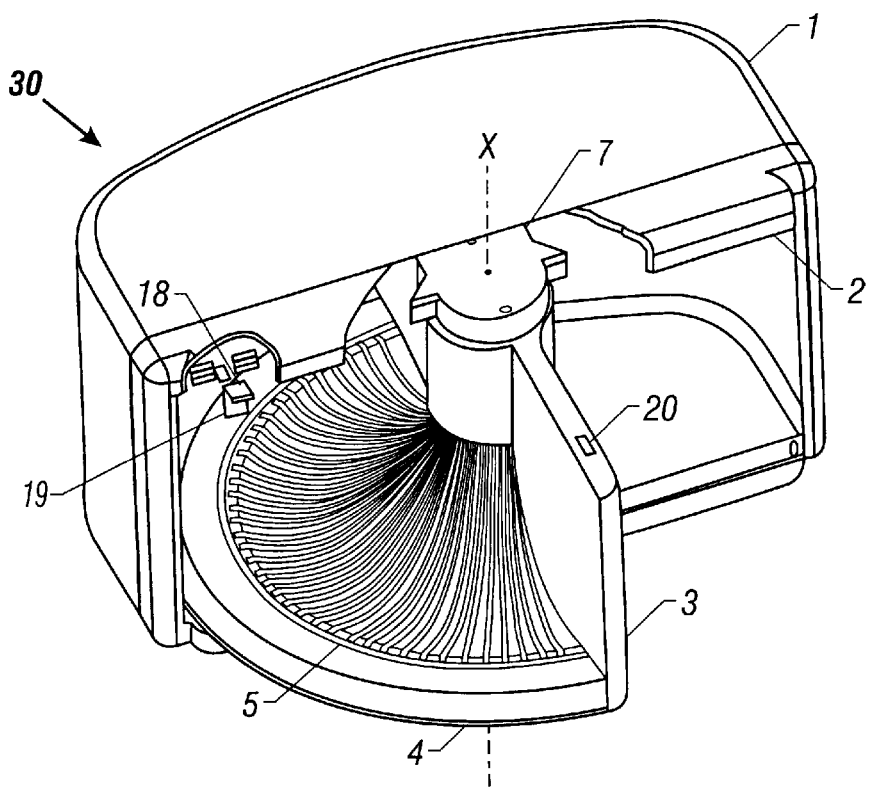
FIG. 2 is an isometric view of a disc container having a turntable in a half-expose position, in accordance with a preferred embodiment of the present invention.

With reference now to FIG. 2, there is illustrated an isometric view of disc container 30 with turntable 3 in a half-exposed position (i.e., half way between a concealed position and an exposed position), in accordance with a preferred embodiment of the present invention. As shown, turntable 3 has a substantially planar front side and a fan-shaped (or semicircular) back side 4. Back side 4 further includes multiple evenly distributed concave storage grooves 5 radially extending from axis x towards a perimeter of back side 4. Each concave storage groove 5 is designed to hold a disc-like storage media (not shown) such as a compact disc, a compact video disc, or a digital-video disc. A user can simply load a disc-like storage media in or retrieve a disc-like storage media from each concave storage groove 5, as desired, once turntable 3 has reached an exposed or semi-exposed position.

Also shown in FIG. 2 is a hole 20 located at the top edge of the front side of turntable 3. Turntable 3 can be maintained in a concealed position by inserting a jog (or latch) 19, which is part of spring-loaded lever 18, into hole 20. By lifting spring-loaded lever 18, jog 19 is removed from hole 20 to allow turntable 3 to turn from a concealed position (as shown in FIG. 1) to a half-exposed position (as shown in FIG. 2), and subsequently to an exposed position (not shown), under the torque from a twist spring contained within a gear box 7. It is understood by those skilled in the art that spring-loaded lever 18 can be modified for allowing turntable 3 to be released by depressing spring-loaded lever 18. Turntable 3 can be returned from an exposed position to a concealed position by manually pushing the front side of turntable 3 in a clockwise direction against the urging of the twist spring until jog 19 again secures turntable 3 by insertion in hole 20.

Figure 3:
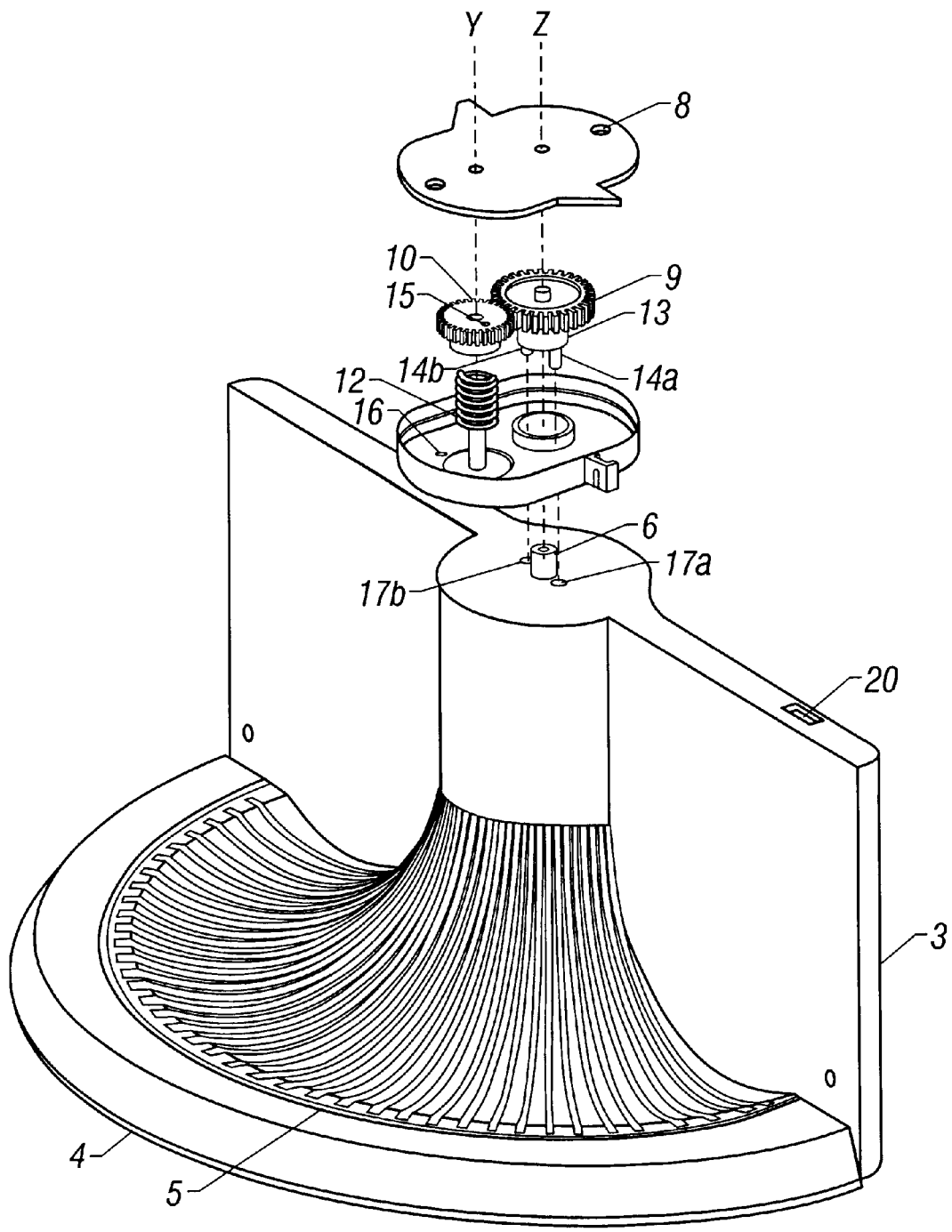
FIG. 3 is an exploded view of a gear box within the disc container from FIG. 1, in accordance with a preferred embodiment of the present invention.

Referring now to FIG. 3, there is illustrated an exploded view of gear box 7 in relation to turntable 3, in accordance with a preferred embodiment of the present invention. Gear box 7, which is covered by a gear box cover 8, includes a primary gear 10 and a secondary gear 9. The teeth of primary gear 10 interlock with the teeth of secondary gear 9. Primary gear 10 and a twist spring 12 are aligned along an axis y. Twist spring 12 has two ends—a top end and a bottom end. The top end of twist spring 12 is captured in a hole 15 located on primary gear 10, and the bottom end of twist spring 12 is captured in a hole 16 located in a floor of gear box 7. Secondary gear 9 is aligned with an upper stem 6 integral to and extending upwardly from the top of turntable 3 along an axis z. Upper stem 6 is received within a void defined by a covering 13 located underneath and integrally coupled to secondary gear 9. To prevent rotation between secondary gear 9 and turntable 3, a first tab 14a is secured within a hole 17a located adjacent to upper stem 6, and a second tab 14b is secured within a hole 17b also located adjacent to upper stem 6.

Gear box 7 is securely fasten to frame 2, as shown in FIG. 2. Primary gear 10, which is coupled to gear box 7 via twist spring 12, can rotate secondary gear 9, which in turn rotates turntable 3. Twist spring 12 is twisted tightly when turntable 3 is held in the concealed position. As mentioned previously, in the concealed position, twist spring 12 is prevented from turning back because turntable 3 is locked by jog 19 extending into hole 20 (see FIG. 1). Once jog 19 is released from hole 20, twist spring 12 begins to "relax" and rotates primary gear 10, secondary gear 9, and subsequently turntable 3.

Figure 4:
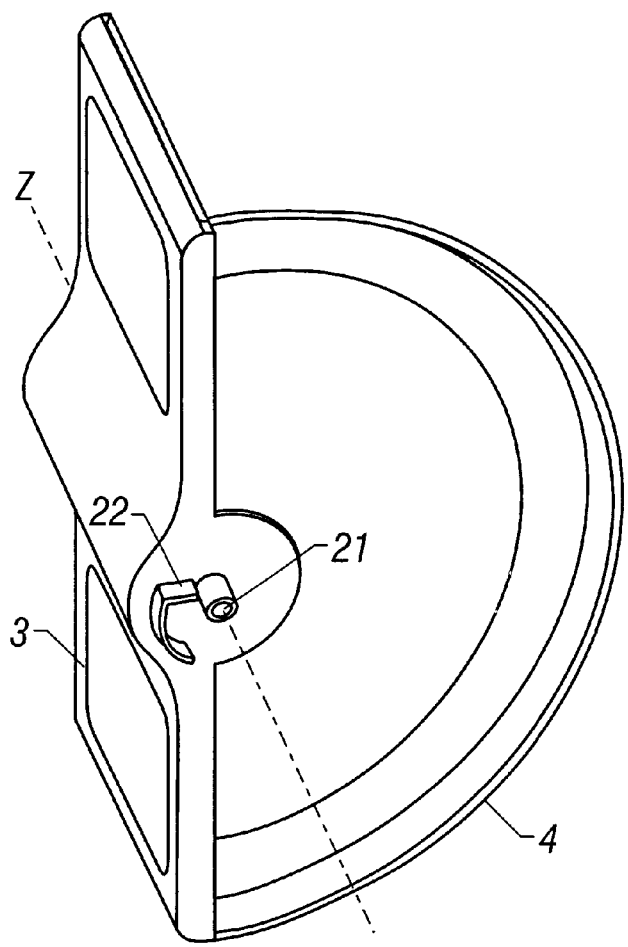
FIG. 4 is an isometric view from the bottom of the turntable within the disc container from FIG. 1, in accordance with a preferred embodiment of the present invention.
Figure 5:
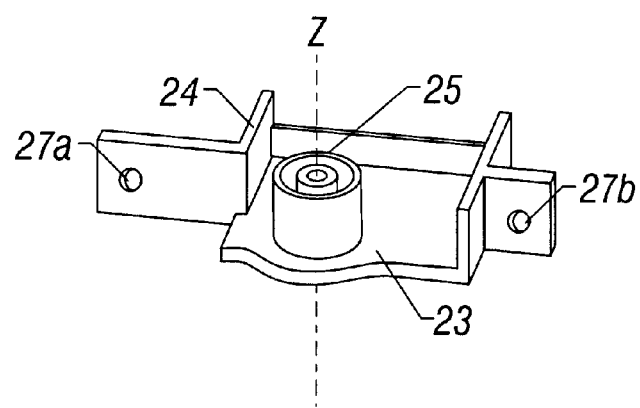
FIG. 5 is an isometric view of a turntable receptacle located on the disc container from FIG. 1, in accordance with a preferred embodiment of the present invention.

FIG. 4 is an isometric bottom view of turntable 3, in accordance with a preferred embodiment of the present invention. Upper stem 6 from FIG. 3 is aligned with a lower stem 21. Lower stem 21 is received within a freely rotatable bearing 25 of a turntable receptacle 23 shown in FIG. 5. Turntable receptacle 23 is securely fastened at the lower portion of frame 2 (from FIG. 2) for supporting turntable 3. Preferably, turntable receptacle 23 is securely fastened at the lower portion of frame 2 via screws through holes 27a and 27b. Turntable receptacle 23 also includes a position restriction bar 24. After turntable 3 has completely turned to an exposed position, i.e., all the storage grooves on backside 4 are facing outward from back cover 1, a V-bar 22 at the bottom of turntable 3 will contact position restriction bar 24, preventing turntable 3 from turning any further.

As has been described, the present invention provides a container having separable slots for storing disc-like storage media such as compact discs. Compared with the prior arts, the present invention is easier to operate and provides better protection to compact discs and the like from dust or scratches.

While the invention has been particularly shown and described with reference to a preferred embodiment, it will be understood by those skilled in the art that various changes in form and detail may be made therein without departing from the spirit and scope of the invention.

What is claimed is:

1. A container for storing substantially planar storage media, said container comprising:
    a back cover having a front opening; and
    a turntable having a substantially planar front side and a fan-shaped back side, wherein said fan-shaped back side includes a plurality of storage grooves radially distributed around said fan-shaped back side, wherein each of said storage grooves is capable of receiving a substantially planar storage medium, wherein said turntable further includes a gear box having a primary gear and a secondary gear, and wherein said turntable is rotatable from a concealed position in which said fan-shaped back side is concealed within said back cover to an exposed position in which said fan-shaped back side is at least partially extends outside of said back cover.

2. The container of claim 1, wherein said container further includes a turntable receptacle for supporting said turntable.

3. The container of claim 2, wherein said turntable receptacle includes a rotatable bearing for receiving a lower stem attached to a bottom of said turntable.

4. The container of claim 1, wherein teeth of said primary gear interlock with teeth of said secondary gear.

5. The container of claim 4, wherein said primary gear is attached to a twist spring and said secondary gear is attached to said turntable.

6. The container of claim 1, wherein said container further includes a jog for securing said turntable in said concealed position.

7. The container of claim 6, wherein said container further includes a release for releasing said jog such said turntable turns from said concealed position to said exposed position.

8. The container of claim 7, wherein said release is spring-loaded.

9. The container of claim 1, wherein said container further includes an open frame connected to said front opening of said back cover.

10. A container for storing disc-like storage media, said container comprising:
    a back cover having a front opening;
    an open frame, connected to said front opening of said back cover, having a release; and
    a turntable having a substantially planar front side and a fan-shaped back side, wherein said fan-shaped back side includes a plurality of concave storage grooves radially distributed around said fan-shaped back side, wherein each of said concave storage grooves is capable of receiving a disc-shaped storage medium, wherein said turntable further includes a gear box having a primary gear and a secondary gear, wherein said turntable is rotatable from a concealed position in which said fan-shaped back side is concealed within said back cover to an exposed position in which said fan-shaped back side is displayed outside of said back cover, after said release has been handled accordingly.

11. The container of claim 10, wherein said container further includes a turntable receptacle for supporting said turntable.

12. The container of claim 11, wherein said turntable receptacle includes a rotatable bearing for receiving a lower stem attached to a bottom of said turntable.

13. The container of claim 10, wherein teeth of said primary gear interlock with teeth of said secondary gear.

14. The container of claim 13, wherein said primary gear is attached to a twist spring and said secondary gear is attached to said turntable.

15. The container of claim 10, wherein said container further includes a jog for securing said turntable in said concealed position.

16. The container of claim 10, wherein said release is spring-loaded.

* * * * *